Oct. 27, 1925.

A. BÖTTNER

VALVE

Filed June 11, 1925

Inventor
Arno Böttner
By
Attorney

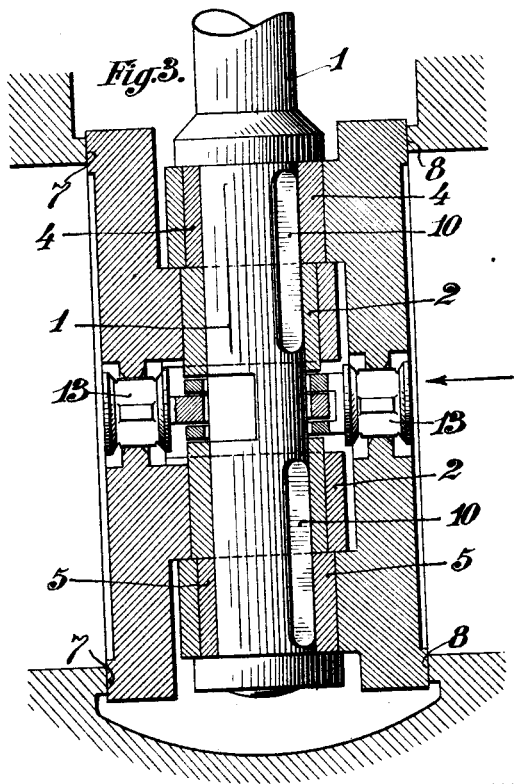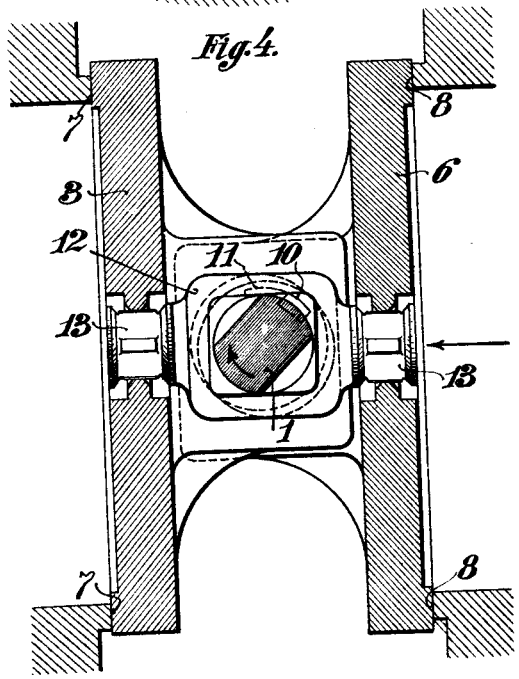

Oct. 27, 1925.　　　　A. BÖTTNER　　　　1,559,515
VALVE
Filed June 11, 1925　　　3 Sheets-Sheet 3

Inventor:
Arno Böttner
By
Attorney

Patented Oct. 27, 1925.

1,559,515

UNITED STATES PATENT OFFICE.

ARNO BÖTTNER, OF SUDENBURG, NEAR MAGDEBURG, GERMANY, ASSIGNOR TO THE FIRM POLTE, OF MAGDEBURG, GERMANY.

VALVE.

Application filed June 11, 1925. Serial No. 36,470.

*To all whom it may concern:*

Be it known that I, ARNO BÖTTNER, a citizen of the German Republic, residing at No. 58 Helmstedterstrasse, Sudenburg, near Magdeburg, Germany, have invented certain new and useful Improvements in Valves, of which the following is a specification.

This invention relates in general to valves for hot steam and high pressure conduits and more particularly to valves of the type described in the pending application Ser. No. 5583 of January the 29th 1925.

These valves comprise two shutting plates which, when the valve is opened, are first lifted from their seats by eccentrics mounted on the valve spindle and then shifted transversely to the fluid passage in the valve for the purpose of completely opening the same.

In accordance with the present invention the valve-operating spindle is arranged to execute a short rotary motion before carrying the eccentrics around with it to lift the shutting plates from their seats. The said small rotary motion is utilized for the actuation of a by-pass which allows a small quantity of hot steam to flow before the shutting plates are lifted from their seats. By this means the conduit controlled by the valve is heated gradually before the main valves or shutting plates are actuated and these latter are effectively relieved of stresses due to the pressure of the steam so that they can be opened and closed with the smallest possible effort. The aforesaid operations of the valve device occur automatically when the valve spindle is turned so that the person handling the valve need not pay attention to details. An advantage over the previous arrangement is that it is not necessary to construct the eccentric in the form of a cock, so that the difficult operation of obtaining a tight seal in such cocks is eliminated. The aforesaid by-pass is preferably controlled by an auxiliary valve arranged in the shutting plates and controlled by the rotary shutter-shifting spindle.

The invention is illustrated by way of example in the drawing to simplify which only the shutting plates and the eccentrics co-operating therewith and mounted on the bottom end of the spindle are shown. The sliding, closing member itself may be arranged in any preferred manner, for example in such a manner that the shifting of the shutting plates towards and away from the middle of the conduit is effected by means of a spindle that moves lengthwise when it is turned by a hand-wheel, which transmits the rotary motion to the nut of the spindle.

Figure 1:
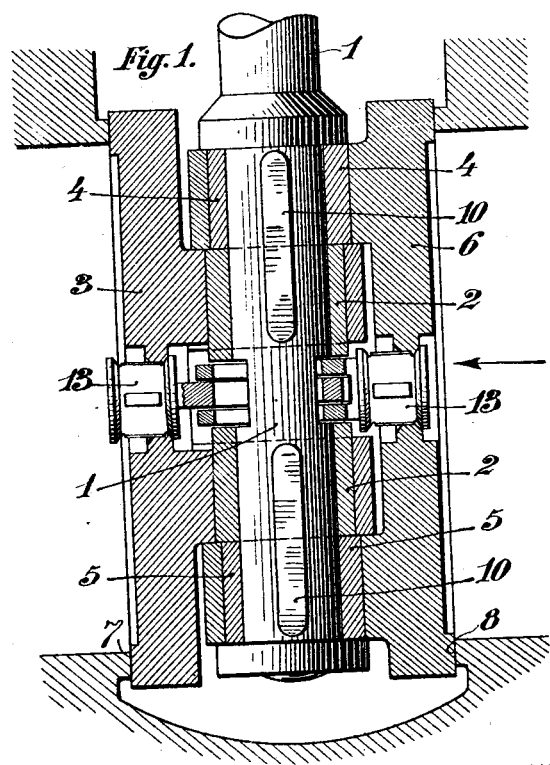
Fig. 1 is a vertical section through the shutting plates and the valve seats, which shows a side view of the lower end of the spindle.
Figure 2:
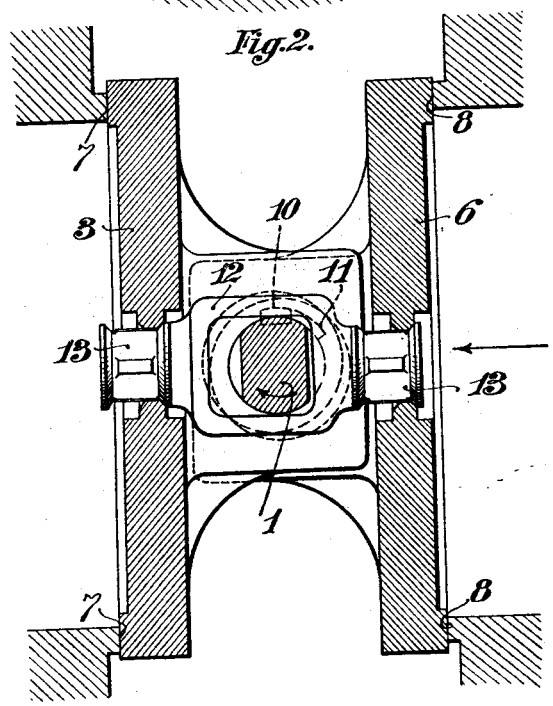
Fig. 2 is a horizontal section of Fig. 1. In both of these figures the shutting plates and the auxiliary by-pass valves mounted in the shutting plates are shown in their closed positions.

Figs. 3 and 4 correspond to Figs. 1 and 2 respectively but with the auxiliary valves opened by a preliminary rotary movement of the valve spindle which still leaves the shutting plates on their seats.

Figure 5:
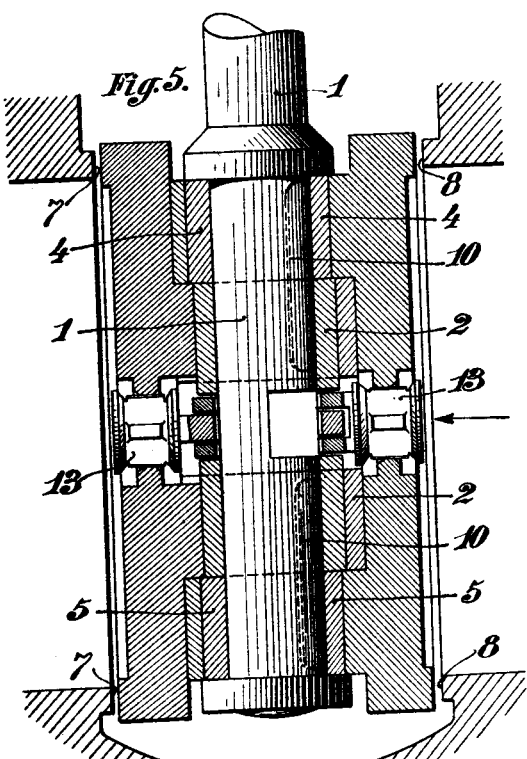
Figure 6:
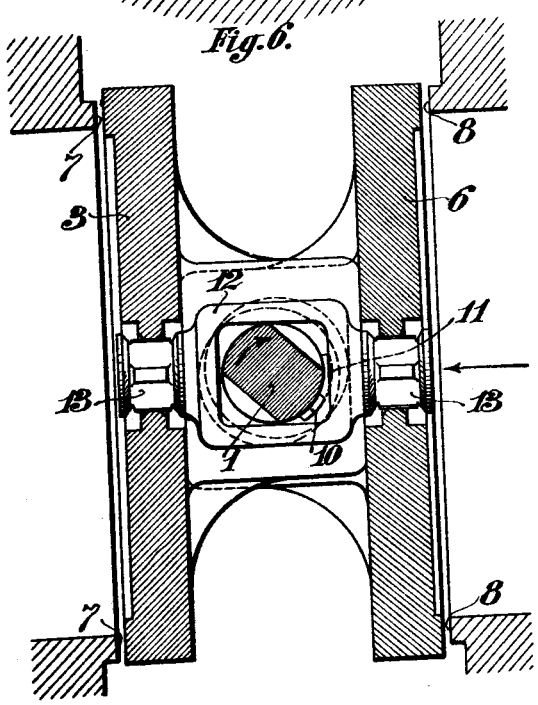

Figs. 5 and 6 also correspond to Figs. 1 and 2 respectively, but the valve spindle is turned farther than in Figs. 3 and 4 so as to also lift the shutting plates from their seats.

Figure 7:
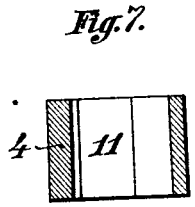
Figure 8:
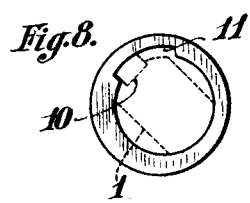

Figs. 7 and 8 are a vertical section and top view respectively of a ring-shaped eccentric mounted on the valve spindle, the spindle being indicated in Fig. 8 by broken lines.

Figure 9:
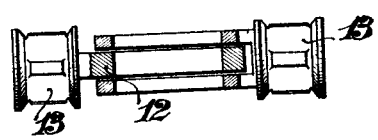
Figure 10:
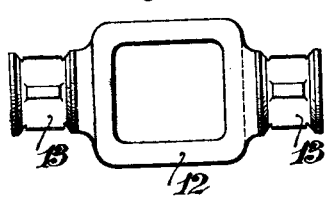

Figs. 9 and 10 are a vertical section and top view respectively of the auxiliary valves mounted in the shutting plates and provided with collars which embrace a flattened section of the spindle.

As will be seen in the drawing the valve comprises two shutting plates 3 and 6 and a spindle 1 on which are mounted three ring-shaped eccentrics 2, 4, 5 which are encircled by eyes projecting from the plates, the eccentric 2 being arranged to move the plate 3 and the eccentrics 4 and 5 being adapted to move the plate 6. The eccentric 2 is displaced around the spindle with respect to the eccentrics 4 and 5 by 180° so that when the spindle is turned both plates are moved towards the spindle i. e. away from their seats or vice versa.

As shown in the drawing keys 10 are embedded in grooves in the spindle 1 and these keys project into internal recesses 11 of the ring-shaped eccentrics, the recesses being of such length that the spindle can be rotated a short distance before the keys 10 turn the eccentrics around with them, Figs. 7 and 8.

The middle eccentric 2 is divided into two parts and the part of the spindle that lies between these two parts is flattened at opposite sides. This flattened portion of the spindle is surrounded by collars 12 integral with or connected to the auxiliary valves 13 arranged in the middle of the shutting plates. The construction and relative positions of the collars 12 is clearly shown in Figs. 9 and 10.

The shutting plates 3 and 6 are carried upward by the lengthwise movement of the spindle 1 when the valve is opened and they are shifted downwards again when the valve is closed. But before the shutting plates 3 and 6 are moved in this manner they are lifted off their seats when the valve is opened, or pressed against their seats after they have been shifted downwards opposite their seats for the purpose of closing the valve.

These operations will now be described in detail. In Figs. 1 and 2 the valve is shown completely closed. When the spindle 1 is turned to open the valve, the keys 10 first execute a short rotary movement in the internal recesses 11 in the ring-shaped eccentrics 2, 4, 5, during which the eccentrics remain stationary. During this preliminary rotary movement of the spindle the collars 12 of the auxiliary valves are actuated to open the valves so that steam or the like passes from one side of a valve to the other and the pressure on the shutting plates is considerably reduced and they are relieved of their stresses. When the spindle 1 reaches the position shown in Figs. 3 and 4 the keys 10 strike against the ends of the internal recesses in the ring-shaped eccentrics and commence turning the latter so as to lift the shutting plates from the stationary seats 7 and 8 in the casing of the valve. This lifting of the shutting plates from their seats (Figs. 5 and 6) requires very little effort because they have already been relieved of their stresses. The plates are now drawn upward by the ascending spindle 1 so as to remove them entirely from the fluid passage through the valve.

When the valve is closed the plates descend with the end of the spindle 1 until their centers register with the center of the fluid conduit or passage. The auxiliary valves 13 remain open until the flat spindle surfaces embraced by the collars of the auxiliary valves are turned into the position in which there is sufficient play between said surfaces and the collars. When this is the case the pressure of the fluid automatically closes the valve 13. The turning movement of the spindle 1 by which the said play between the flat surfaces and the collars 12 is obtained serves to turn the ring-shaped eccentrics and these, in turn, press the shutting plates 3 and 6 against their seats to finally close the valve.

I claim:

1. A valve comprising two stationary seats, two shutting plates which cooperate with said seats, auxiliary valves, a valve spindle, and means for first opening the auxiliary valves, then lifting the shutting plates from their seats and thereupon shifting the plates in a plane that is parallel to the plane of said stationary seats when the valve spindle is turned.

2. A valve comprising two stationary seats, two shutting plates which cooperate with said seats, auxiliary valves seated in said shutting plates, a spindle for shifting said plates in a plane that is parallel to the plane of said stationary seats, eyes projecting from said shutting plates, eccentrics embracing said spindle and fitted in said eyes, collars on said auxiliary valves which embrace said spindle, a cam surface on said spindle for opening said auxiliary valves when the spindle is turned, and means associated with the spindle and eccentrics for lifting the shutting plates from said stationary seats after the opening of the auxiliary valves when the spindle is turned.

3. A valve comprising two stationary seats, two shutting plates which cooperate with said seats, auxiliary valves seated in said shutting plates, a spindle for shifting said plates in a plane that is parallel to the plane of said stationary seats, eyes projecting from said shutting plates, internally recessed ring-shaped plate lifting eccentrics embracing said spindle and fitted in said eyes, collars on said auxiliary valves which embrace said spindle, a cam surface on said spindle for opening said auxiliary valves when the spindle is turned, keys fixed in the spindle and located in the recesses of the eccentrics and adapted to turn the latter to lift the shutting plates from said stationary seats after the opening of the auxiliary valves when the spindle is turned.

4. A valve comprising two stationary seats, two shutting plates which cooperate with said seats; auxiliary valves seated in said shutting plates, a spindle for shifting said plates in a plane that is parallel to the plane of said stationary seats, eyes projecting from said shutting plates, internally recessed ring-shaped plate lifting eccentrics embracing said spindle and fitted in said eyes, collars on said auxiliary valves which embrace said spindle, a cam surface on said spindle for opening said auxiliary valves when the spindle is turned, keys fixed in the spindle and located in the recesses of the eccentrics and adapted to turn the latter to lift the shutting plates from said stationary seats after the opening of the auxiliary valves when the spindle is turned, the length of said recesses corresponding to the lag between the opening of the auxiliary valves and the lifting of the shutting plates.

In testimony whereof I affix my signature.

ARNO BÖTTNER.